US009463804B2

(12) United States Patent
Szwabowski et al.

(10) Patent No.: US 9,463,804 B2
(45) Date of Patent: Oct. 11, 2016

(54) VEHICLE CORNERING MODES

(71) Applicant: Ford Global Technologies, LLC, Dearborn, MI (US)

(72) Inventors: Steven Joseph Szwabowski, Northville, MI (US); David Starr, Pinckney, MI (US); Fling Tseng, Ann Arbor, MI (US); Kwaku O. Prakah-Asante, Commerce Township, MI (US); Jianbo Lu, Northville, MI (US)

(73) Assignee: FORD GLOBAL TEHNOLOGIES, LLC, Dearborn, MI (US)

( * ) Notice: Subject to any disclaimer, the term of this patent is extended or adjusted under 35 U.S.C. 154(b) by 39 days.

(21) Appl. No.: 14/537,923

(22) Filed: Nov. 11, 2014

(65) Prior Publication Data
US 2016/0129912 A1 May 12, 2016

(51) Int. Cl.
*B60W 40/072* (2012.01)

(52) U.S. Cl.
CPC .................. *B60W 40/072* (2013.01)

(58) Field of Classification Search
CPC .................................. B60W 40/072
USPC ............................................... 701/1
See application file for complete search history.

(56) References Cited

U.S. PATENT DOCUMENTS

| | | | | |
|---|---|---|---|---|
| 6,070,118 A * | 5/2000 | Ohta | ................ | B60K 31/0066 477/97 |
| 6,205,391 B1 * | 3/2001 | Ghoneim | .............. | B60T 8/1755 180/167 |
| 6,502,033 B1 * | 12/2002 | Phuyal | .................. | G01C 21/30 340/988 |
| 8,078,381 B2 * | 12/2011 | Yamakado | ......... | B60K 31/0066 180/179 |
| 8,521,338 B2 | 8/2013 | Takeuchi et al. | | |
| 8,521,367 B2 * | 8/2013 | Mulder | ................ | B60W 30/12 701/42 |
| 8,781,644 B2 * | 7/2014 | Samukawa | ........... | B60W 50/14 701/1 |
| 8,781,698 B2 * | 7/2014 | Maier | ..................... | F16H 59/66 701/65 |
| 8,958,925 B2 * | 2/2015 | Chen | ................... | B60W 40/072 340/438 |
| 9,139,173 B2 * | 9/2015 | Yasui | ........................ | B60T 7/12 |
| 2004/0036601 A1 * | 2/2004 | Obradovich | ........... | G08G 1/167 340/540 |
| 2005/0090963 A1 | 4/2005 | Kuhn et al. | | |
| 2005/0187705 A1 * | 8/2005 | Niwa | ..................... | G01C 21/26 701/448 |
| 2005/0240334 A1 * | 10/2005 | Matsumoto | ........ | B60K 31/0083 701/93 |
| 2006/0287826 A1 * | 12/2006 | Shimizu | ................ | B60K 35/00 701/431 |
| 2010/0023180 A1 | 1/2010 | Huang et al. | | |
| 2010/0209888 A1 | 8/2010 | Huang et al. | | |
| 2011/0102166 A1 * | 5/2011 | Filev | ..................... | B60W 30/02 340/435 |
| 2011/0160964 A1 * | 6/2011 | Obradovich | ...... | G06F 17/30315 701/41 |
| 2012/0203426 A1 | 8/2012 | Held et al. | | |
| 2012/0296539 A1 * | 11/2012 | Cooprider | ............. | B60W 10/06 701/70 |
| 2012/0303222 A1 * | 11/2012 | Cooprider | ............. | B60W 10/06 701/48 |
| 2014/0207336 A1 * | 7/2014 | Oblizajek | ............ | B62D 15/025 701/42 |
| 2014/0244125 A1 * | 8/2014 | Dorum | .................... | G01C 21/32 701/70 |
| 2015/0112548 A1 * | 4/2015 | D'Amato | .............. | B60W 40/06 701/36 |
| 2015/0151753 A1 * | 6/2015 | Clarke | ................... | B60W 30/00 701/25 |

FOREIGN PATENT DOCUMENTS

| | | | |
|---|---|---|---|
| JP | 62074720 A | | 4/1987 |
| JP | 2012131495 A | * | 7/2012 |
| JP | 2012131496 A | * | 7/2012 |

* cited by examiner

*Primary Examiner* — Atul Trivedi
(74) *Attorney, Agent, or Firm* — Frank A. MacKenzie; Bejin Bieneman PLC

(57) ABSTRACT

A curve length, a curve size, and a curve heading angle change of a roadway being traveled by a vehicle are determined. Each of the curve length, the curve size, and the curve heading angle are compared with one or more threshold values to obtain a driving mode request.

20 Claims, 4 Drawing Sheets

VEHICLE CORNERING MODES

BACKGROUND

Vehicles sometimes allow a driver with the ability to manually select a drive mode from two or more available modes, each intended to offer a benefit to the driver under certain driving conditions. However, as more distinct driving modes become available, a driver user interface must be more and more complicated, and an amount of driver interaction needed to benefit from a plurality of available driving modes undesirably increases.

Turning or cornering is a usage scenario frequently encountered by drivers in many driving contexts. While it may be desirable to immediately change operating mode settings of some vehicle systems whenever the driver is cornering, this is not the case with all vehicle systems. Unfortunately, present systems may not distinguish between different classifications of cornering contexts, and may not allow for appropriate selection of cornering modes.

DRAWINGS

DESCRIPTION

Introduction

Disclosed herein are systems and methods for obtaining and using various data for determining an appropriate cornering mode for a vehicle. For example, a system as presently disclosed includes a computer programmed to classify one or more of a road curve length, a road curve heading angle change characteristic and a road curve size, i.e., radius. Based on a combination of the foregoing classifications, and possibly also based on road data such as a kind of road being traveled, a number of curves on a road being traveled within a certain distance, etc., as well as possibly based on data related to a particular vehicle driver, the computer is further programmed to a vehicle driving mode or modes, e.g., to determine characteristics of operation for a vehicle chassis and/or powertrain.

System Overview

Figure 1:
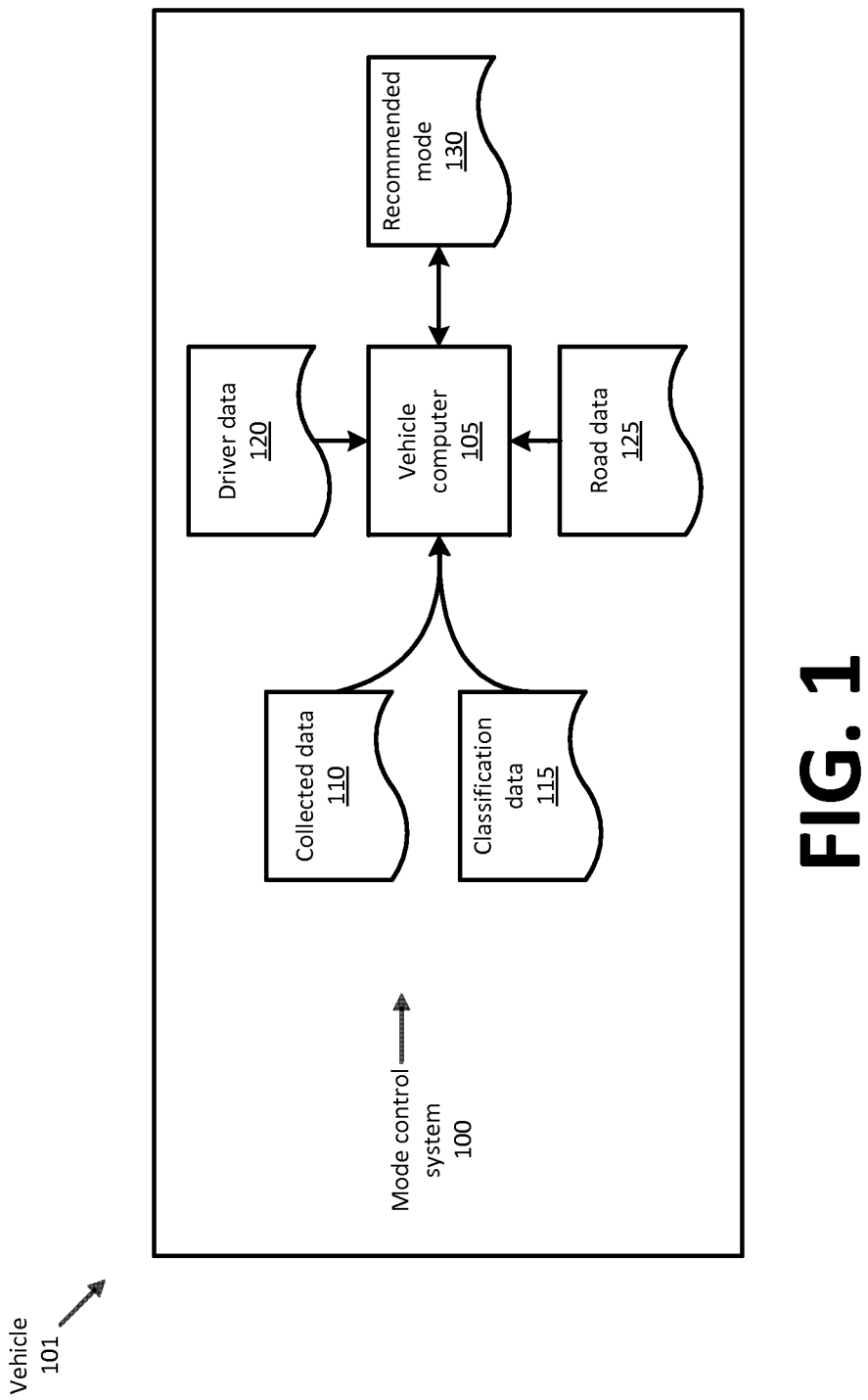
FIG. 1 is a block diagram of a system for managing vehicle cornering modes.

FIG. 1 is a block diagram of a system 100 for managing vehicle 101 cornering modes. As illustrated in FIG. 1, the system 100 is usually implemented in a vehicle 101, and various elements of the system 100 are elements or components in the vehicle 101.

A vehicle 101 computer 105 included in the system 100 for carrying out various operations, including as described herein, generally includes a processor and a memory, the memory including one or more forms of computer-readable media, and storing instructions executable by the processor for performing various operations, including as disclosed herein. The memory of the computer 105 further generally stores remote data received via various communications mechanisms; e.g., the computer 105 is generally configured for communications on a controller area network (CAN) bus or the like, and/or for using other wired or wireless protocols, e.g., Bluetooth, etc. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., e.g., controllers and sensors as discussed herein. Although one computer 105 is shown in FIG. 1 for ease of illustration, it is to be understood that the computer 105 could in fact, include, and various operations described herein could be carried out by, one or more computing devices, e.g., vehicle component controllers such as are known and/or a computing device dedicated to the system 100.

A memory of the computer 105 generally stores the collected data 110. Data 110 may include data collected from a variety of devices. Data 110 may additionally include data calculated therefrom in the computer 105. In general, collected data 110 may include any data that may be gathered by a collection device and/or computed from such data. For example, as illustrated in FIG. 1, data 110 can be provided by one or more collections devices such as ultrasonic sensors, cameras, and/or data collectors that collect dynamic vehicle 101 data, such as velocity, yaw rate, steering angle, etc. Further, the foregoing examples are not intended to be limiting; other types of data collectors could be used to provide data 110 to the computer 105.

For example, various controllers in a vehicle may operate to provide data 110 via the CAN bus, e.g., data 110 relating to vehicle speed, acceleration, etc. Further, sensors or the like, global positioning system (GPS) equipment, etc., could be included in a vehicle and configured as to provide data 110 directly to the computer 105, e.g., via a wired or wireless connection. Further, sensors other than sensors mentioned above are known and may be used for determining a vehicle 101 speed, heading, steering angle, etc.

The computer 105 memory further generally stores curve classification data 115. The classification data 115 includes data classifying curves that a vehicle 101 may encounter according to various criteria. In general, the term "curve" as used herein with respect to a roadway on which a vehicle 101 travels means a segment of a roadway that deviates from a straight line in a particular direction, e.g., to the left or to the right with respect to a vehicle's forward progress, and that exhibits a relatively constant rate of curvature, e.g., a rate of curvature within a predetermined range such that for any given segment of the length of the curve a heading angle of a vehicle negotiating the curve will change at a rate within the range, e.g., will not deviate plus or minus 3 degrees, five degrees, etc., in one direction or the other.

Further, classification data 115 may include each of a set of road curve length classifications, road curve heading angle change classifications, and curve size classifications. The classification data 115 can include other classifications as well, such as a classification of cornering frequencies, i.e., a frequency of curves on a roadway, e.g., a number of curves within a predetermined distance, e.g., a kilometer, 10 kilometers, etc.

Figure 3:
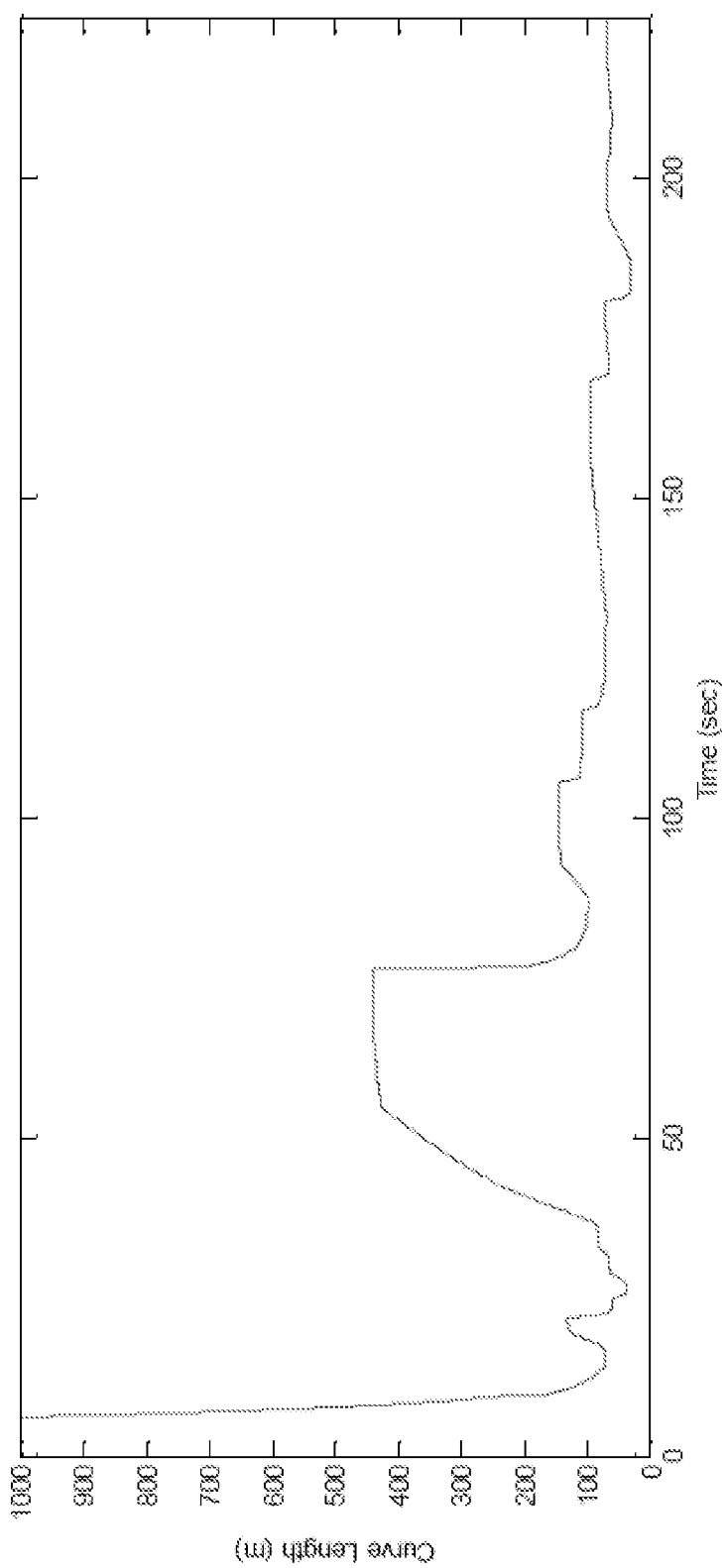
FIG. 3 is a graph of a sample set of data showing curve lengths as a vehicle traverses a roadway.

A road curve length is a length of a road, e.g., in meters, associated with a curve. FIG. 3 is a graph of a sample set of data showing curve lengths as a vehicle traverses a roadway. As can be seen, various curve links traversed for various periods of time can be identified from data 115. That is, data 115 can identify periods of time for which a vehicle heading angle changes by a predetermined amount, as the heading angle changes, a distance traveled can be recorded, thereby providing a curve length traversed at a particular point in time. Accordingly, lengths of curves traversed by the vehicle 101 can be classified, e.g., straight line (i.e., no curve) up to 100 meters, 100 to 200 meters, 200 to 300 meters, etc. As discussed below, a detected length of a curve or curves on a roadway can be associated with particular desired driving characteristics for a vehicle 101 chassis and/or powertrain. Accordingly, curve length classification data 115 may indicate various classes of curve links, and which may then be associated with threshold values as described below that are used to determine requested modes 130 for the vehicle 101.

Figure 4:
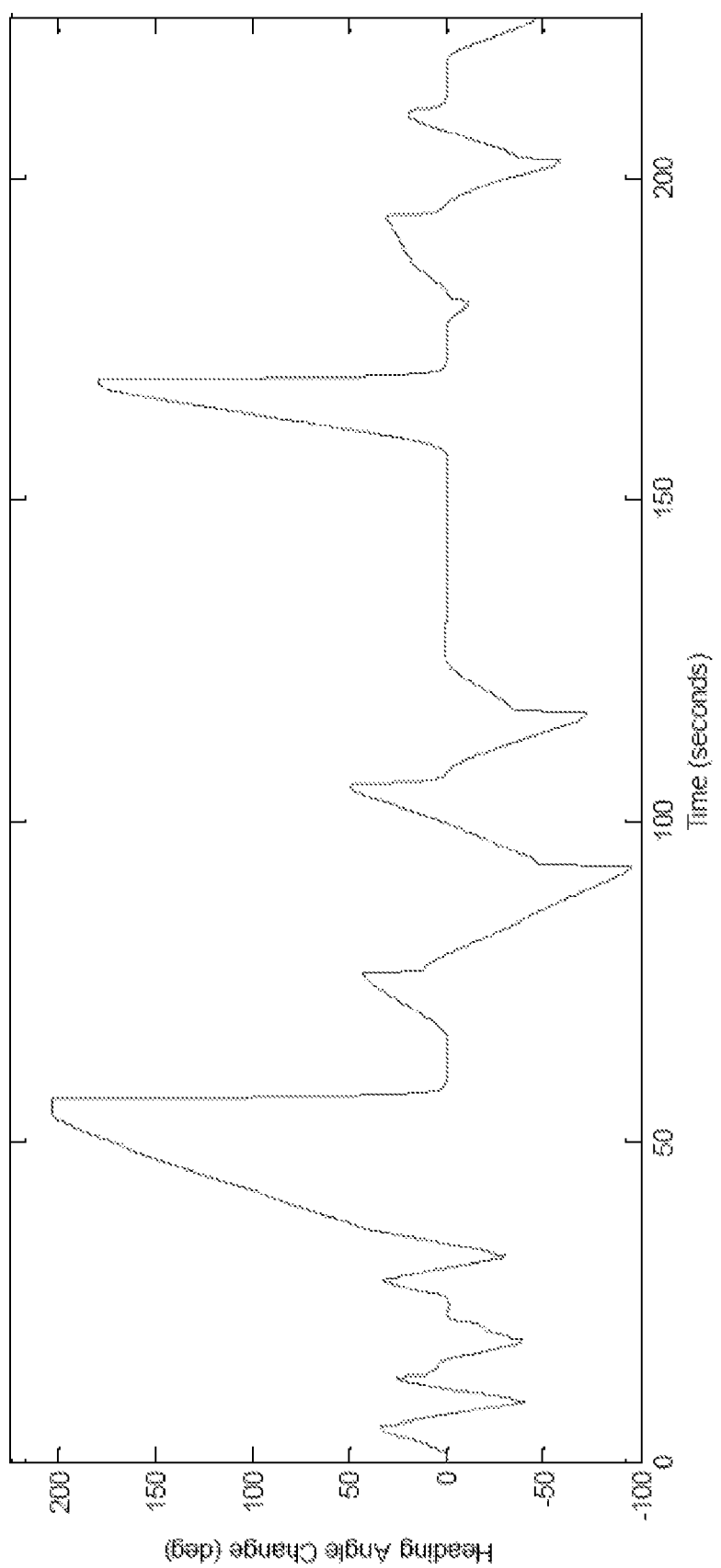
FIG. 4 is a graph of a sample set of data showing heading angle changes as a vehicle traverses a roadway.

A road curve heading angle change is a heading angle change of a vehicle associated with a curve. FIG. 4 is a graph of a sample set of data showing heading angle changes as a vehicle traverses a roadway. As can be seen, a heading angle change may be zero degrees, indicating that a vehicle 101 is driving on a straight line (i.e., no curve). However, as heading angle changes in one lateral direction or the other with respect to the vehicle 101, a curve is indicated. Heading angle changes, like curve lengths, can be associated with various driving characteristics or modes, e.g., sharper heading angle changes may make desirable a stiffer chassis, a more responsive powertrain, etc.

A road curve size is generally defined for present purposes of this disclosure as a radius of a circle tangent to a center point or midway point, or some other selected representative point, of a curve. It will be understood that a road curve size can be determined by using data 115 indicating a road curve length and an average heading angle change associated with the road curve length.

In general, classification data 115 for a vehicle 101 may be empirically determined for a particular make, model, trim level, engine type, etc. of a vehicle 101. For example, a test track may be used to drive a vehicle in various scenarios, e.g., on paths including various curves with various lengths, sizes, heading angle changes, etc. Classification data 115 can include, for example, various curve characteristics such as the foregoing, which then can be associated with a requested driving mode 130.

Driver data 120 relates to a particular driver of the vehicle 101. For example, a driver may be identified by providing input to an interface provided by the computer 105, via a biometric mechanism, etc. In any event, driver data 120 can include information such as the driver's typical behavior when entering a curve, when driving through a curve, and when leaving a curve. Further, driver data 120 can characterize a driver's driving style, e.g., "conservative," "moderate," "aggressive," etc. Further, such characterizations can be derived from collected data 110 indicating a driver's driving habits, such as data 110 indicating an average speed, a tendency of the driver to drive slower than, meet, or exceed posted speed limits, a driver's frequency of making lane-changes, etc.

Road data 125 provides information relating to a road or roads that may be traversed by the vehicle 101. For example, the road data 125 may be correlated with collected data 110 from a global positioning system (GPS) or other navigation system included in the vehicle 101. Accordingly, the computer 105 can identify a road being traversed by the vehicle 101, and can access road data 125 for the road. For example, road data 125 can include a road grade at a location or locations, incidence of a curve or curves on the road, characteristics of curves such as length, heading angle changes, sizes, etc.

As described further below, data 110, 115, 120 and/or 125 may be used to generate a requested mode 130. That is, based on information relating to a curve being approached or traversed by a vehicle 101, the computer 105 can select a mode appropriate for the vehicle 101, the curve, as well as possibly a driver's personal driving style.

Processing

Figure 2:
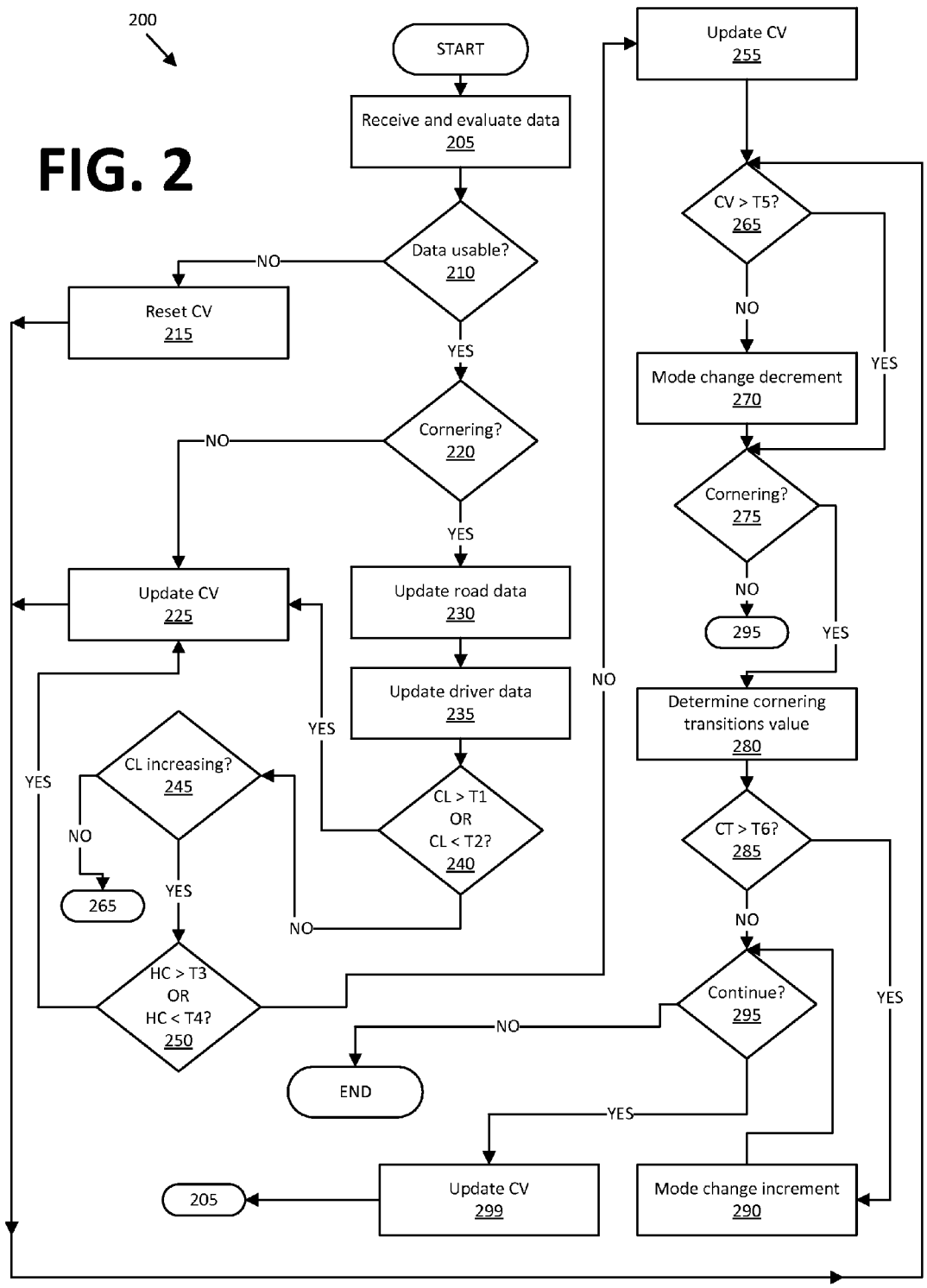
FIG. 2 is a process flow diagram illustrating an exemplary process for selecting a vehicle cornering mode.

FIG. 2 is a process flow diagram illustrating an exemplary process 200 for selecting a vehicle cornering mode. The process 200 begins in a block 205, in which the computer 105 receives and evaluates data 110. For example, data 110 may be received from a variety of sensors, controllers, etc., in the vehicle 101 as described above and may be sampled with respect to different points in space and/or different points in time. The data 110 may be used to determine curve characteristics such as size, length, heading angle change, etc., as described above, which characteristics may then be compared to characteristics determined by a classifier and associated with a requested mode 130. In any case, in the block 205, the data 110 is received and its quality is evaluated. For example, the computer 105 may determine whether a signal quality of data 110, e.g., from one or more vehicle 101 sensors, is sufficient, whether a sufficient amount of data 110 related to a particular curve characteristic is received, etc.

In the block 210, the computer 105 determines whether the received data 110 is usable, i.e., whether the vehicle 101 is traveling in a fashion so as to generate data 110 that can be used to determine a requested mode 130. If yes, the process 200 proceeds to a block 220. If no, the process 200 proceeds to a block 215. In general, in the block 210, the computer 105 determines whether the vehicle 101 is driving in an environment where adjusting a mode 130 based on vehicle 101 cornering is appropriate. For example, if vehicle 101 speed is below a predetermined threshold (e.g., 20 kilometers per hour), the computer 105 may be programmed to determine that the data 100 is not usable. Likewise, if GPS data 110 indicated that the vehicle 101 is not on a roadway, e.g., is in a parking lot or the like, the computer 105 may be programmed to determine that the data 110 is not usable.

In the block 215, the computer 105 re-sets a cornering value CV to a default value. Following the block 215, the process 200 proceeds to a block 265.

The value CV generally provides a quantitative measure of a percentage of a driving distance (and generally not over time, so that speed changes will not affect the value CV) that a vehicle 101 has spent cornering. This percentage can be normalized to a value of between zero and one for convenience. The distance for which the value CV is determined may be tunable, e.g., varied according to an average speed of the vehicle 101, a type of roadway being travelled, etc. In any case, the more time spent in curves, i.e., cornering, the higher a cornering value CV. A default value, which is the value to which CV is generally initially set, may be zero.

The value CV could be determined in other ways. For example, CV could be determined according to a number of curves traversed by the vehicle 101 within the tunable distance, each curve possibly weighted according to its distance. Further, curves or corners could be weighted according to a type of cornering event, e.g., a vehicle 101 lane change may be accorded a certain first weight, whereas negotiating a curve on an interstate highway could be accorded a second weight, etc.

In the block 220, which may follow the block 210, the computer 105 determines whether the vehicle 101 is "cornering," that is, whether a curve is detected, i.e., whether the vehicle 101 is in a curve or is within a predetermined distance and/or time of entering a curve, e.g., within 100 meters, 500 meters, etc. and/or within five seconds, 10 seconds, etc., of entering a curve. Steering angle changes, lateral acceleration of a vehicle 101, etc., may be used to determine if the vehicle 101 is negotiating a curve, i.e., is cornering. If a curve is not detected, i.e., the vehicle 101 is not cornering, then a block 225 is executed next. If the vehicle 101 is cornering, then a block 230 is executed next.

In the block 225, the computer 105 updates the cornering value CV. Generally, CV will be decreased in the block 225, because the block 225 is visited when the computer 105 has determined that the vehicle 101 is not cornering or, is cornering to a lesser degree than previously (e.g., where the block 225 is visited following the blocks 240 or 250 described below). That is, assuming that the cornering value was greater than zero entering the block 225, the cornering value will decrease in the block 225 because, if the vehicle is not now cornering, less of the driving distance for which CV is determined will be associated with cornering than was the case coming into the block 225. For example, assume that the driving distance is five kilometers, and that, entering the block 225, CV=0.5. Further, assume that the vehicle 101 has driven a tenth of a kilometer since CV was last updated. In that case, CV will be decreased to reflect the fact that, for the last 1/10 kilometer, the vehicle 101 has not been in a curve, i.e., cornering. Following the block 225, the process 200 proceeds to the block 265.

In the block 230, the computer 105 updates road data 125. For example, the computer 105 may have access to location information, e.g., geo-coordinates supplied by a GPS navigational system. Such coordinates can be used to access map data stored in the computer 105 to determine road data of a road being traversed by the vehicle 101, e.g., presence of curves, a number of curves within an upcoming distance, e.g., one kilometer, three kilometers, etc., size, length, etc. of curves, and other data related to the road, such as a type of road (e.g., city street, interstate highway, etc.). Further, road data 125 could be updated based on collected data 110, e.g., indicating a type of road surface, a road condition (e.g., wet, icy, etc.), a road grade, etc. In any case, the block 220 generally includes updating heading change and road curve length data 125.

Following the block 230, in a block 235, the computer 105 retrieves or updates driver data 120. For example, the driver data 120 may indicate a preference of an identified driver relating to driving style, driving modes, etc. For example, a driver may be classified as aggressive, non-aggressive, moderately-aggressive, etc. Note that the block 230 is optional; a mode recommendation 130 may take into account driver data 120, but a mode recommendation may be provided without driver data 120.

Following the block 235, in a block 240, the computer 105 determines whether a curve length CL of a curve being traversed by the vehicle 101 is of greater length than a predetermined threshold T1, or of less length than a predetermined threshold T2. If both or either of these conditions is met, then the process 200 proceeds to the block 225. However, if neither of the conditions is met, then the process 200 proceeds to a block 245.

Note that, as mentioned above, the thresholds T1 and T2, and other thresholds mentioned herein, may be determined according to classification data 115. Classification data 115 is generally used to determine a distance for which the value CV is determined as well as the various thresholds discussed with respect to the process 200. For example, a curve length, size, heading angle change as indicated in road data 125 may fall into respective classifications included in the data 115. The classifications in the data 115 may in turn be associated with respective driving modes.

In the block 245, the computer 105 determines whether the curve length CL is greater than a last previously recorded curve length value, i.e., whether the curve length CL is increasing. If so, then a block 250 is executed next. Otherwise, the process 200 proceeds to the block 265.

In the block 250, the computer 105 determines whether a heading angle change HC associated with a curve being traversed by the vehicle 101 is greater than a value determined by a third threshold T3 or less than a value determined by a fourth threshold T4. If both or one of the conditions are met, then the process 200 proceeds to a block 225. However, if neither of the conditions is met, then the process 200 proceeds to a block 255.

In the block 255, the computer 105 updates the cornering value CV. In contrast to the block 225, described above, in the block 255 CV is generally increased. That is, if a cornering length CL is increasing (block 245) and a heading angle change is within a predetermined range, then CV is increased.

In the block 265, which follows the block 255, the computer 105 determines whether the value CV exceeds a fifth threshold value T5. If not, then a block 270 is executed next. If so, a block 275 is executed next.

In the block 270, the computer 105 decrements a requested mode 130, i.e., indicates that a driving mode should be changed in the vehicle 101. As discussed above, a driving mode 130 may include a configuration of a vehicle 101 chassis and/or powertrain. To "decrement" a requested mode 130 means to adjust the mode 130 to accommodate a lower degree of corning. For example, decrementing might mean changing a mode 130 from a sportier mode to a less sporty mode, e.g., changing the gearing on a powertrain to accommodate straightaways, "softening" a suspension, etc. Further, driver data 120 and road data 125, such as a type of road, e.g., city street, highway, interstate highway, etc., may be included as a factor in determining a mode request 130. For example, a mode request 130 may be decremented an additional amount, that would otherwise be the case in the block 270, or less than an additional amount, based on data 120, 125.

In the block 275, which may follow either the block 265 or 270, The computer 105 determines whether the vehicle 101 is in the process of cornering, e.g., looks at the result of the block 220. If not, the process 200 proceeds to a block 295. If the vehicle 101 is in the process of cornering, then the process 200 proceeds to a block 280.

In the block 280, the computer 105 determines a number of cornering events within the distance of road traveled for which CV is determined, e.g., a number of times that the process has entered the block 230 from the block 220, i.e., that the vehicle 101 has been determined to be cornering. This number is sometimes referred to as a cornering transitions value CT.

In a block 285, following the block 280, the computer 105 determines whether the value CT exceeds a sixth threshold T6. If so, a block 290 is executed next. Otherwise, the process 200 proceeds to the block 295.

In the block 290, the computer 105 increments a mode request 130 indicating that a driving mode should be changed in the vehicle 101. To increment a mode 130 generally means to change the requested mode 130 to be more accommodating for corning, e.g., to change powertrain gearing and or suspension setting to better handle curves. Further, as in the block 270, data 120, 125 may be taken into account.

In the block 295, the computer 105 determines whether the process 200 should continue. For example, the vehicle 101 may stop, be powered off, etc., in which case the process 200 may end. Otherwise, the process 200 proceeds to a block 299.

In the block 299, the value CV is updated as described above concerning the blocks 225, 255. The process 200 then returns to the block 205.

CONCLUSION

With respect to the meaning of various terms used herein, "speed" and "velocity" are used interchangeably to refer to an amount of distance traveled per unit of time (e.g., miles per hour, kilometers per hour, etc.). As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computing device that includes a processor and a memory, the memory storing instructions executable by the processor to:
   determine a curve length, a curve size, and a curve heading angle change of a roadway being traveled by a vehicle;
   compare each of the curve length, the curve size, and the curve heading angle with one or more threshold values to obtain a driving mode request; and
   implement the requested driving mode to determine characteristics of operation of components of the vehicle.

2. The system of claim 1, wherein the instructions further include instructions to use driver data relating to a characteristic of a vehicle driver to obtain the driving mode request.

3. The system of claim 1, wherein the instructions further include instructions to use data relating to a type of road to obtain the driving mode request.

4. The system of claim 1, wherein the thresholds are determined according to classification data including classifications of a plurality of curve characteristics that include curve length, curve size, and curve heading angle change.

5. The system of claim 1, wherein the instructions further include instructions to determine that a vehicle speed exceeds a first predetermined threshold before obtaining the driving mode request.

6. The system of claim 1, wherein the instructions further include instructions to determine that a vehicle is cornering before obtaining the driving mode request.

7. The system of claim 1, wherein the instructions further include instructions to determine a cornering value that provides an indication of a percentage of a predetermined distance for which a vehicle has been cornering.

8. The system of claim 7, wherein the instructions further include instructions to decrement a driving mode to obtain the driving mode request if the cornering value fails to exceed a second predetermined threshold.

9. The system of claim 7, wherein the instructions further include instructions to increment a driving mode to obtain the driving mode request if the cornering value exceeds a second predetermined threshold.

10. The system of claim 9, wherein the instructions further include instructions to determine a cornering transition value that identifies a predetermined number of cornering events for the predetermined distance; further wherein the driving mode is incremented only if the cornering transitions value exceeds a third predetermined threshold.

11. A method, implemented in a computing device, the method comprising:
    determining a curve length, a curve size, and a curve heading angle change of a roadway being traveled by a vehicle;
    comparing each of the curve length, the curve size, and the curve heading angle with one or more threshold values to obtain a driving mode request; and
    implement the requested driving mode to determine characteristics of operation of components of the vehicle.

12. The method of claim 11, further comprising using driver data relating to a characteristic of a vehicle driver to obtain the driving mode request.

13. The method of claim 11, further comprising using data relating to a type of road to obtain the driving mode request.

14. The method of claim 11, wherein the thresholds are determined according to classification data including classifications of a plurality of curve characteristics that include curve length, curve size, and curve heading angle change.

15. The method of claim 11, further comprising determining that a vehicle speed exceeds a first predetermined threshold before obtaining the driving mode request.

16. The method of claim 11, further comprising determining that a vehicle is cornering before obtaining the driving mode request.

17. The method of claim 11, further comprising determining a cornering value that provides an indication of a percentage of a predetermined distance for which a vehicle has been cornering.

18. The method of claim 17, further comprising decrementing a driving mode to obtain the driving mode request if the cornering value fails to exceed a second predetermined threshold.

19. The method of claim 17, further comprising incrementing a driving mode to obtain the driving mode request if the cornering value exceeds a second predetermined threshold.

20. The method of claim 19, further comprising determining a cornering transition value that identifies a predetermined number of cornering events for the predetermined distance; further wherein the driving mode is incremented only if the cornering transitions value exceeds a third predetermined threshold.

* * * * *